June 10, 1969  C. B. LUNDSAGER  3,449,054
MARKING PEN
Filed May 20, 1966
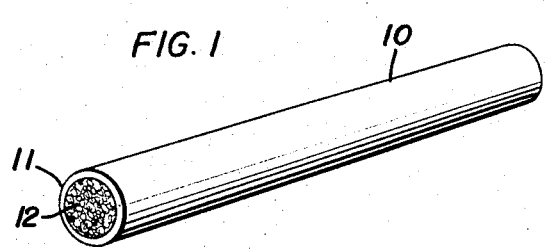
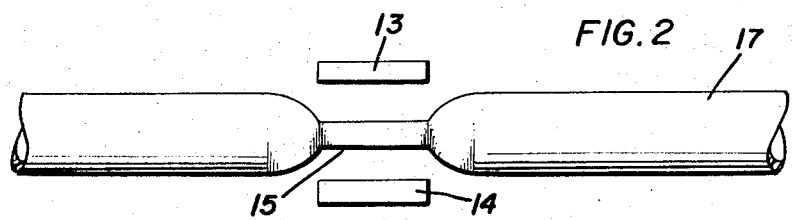
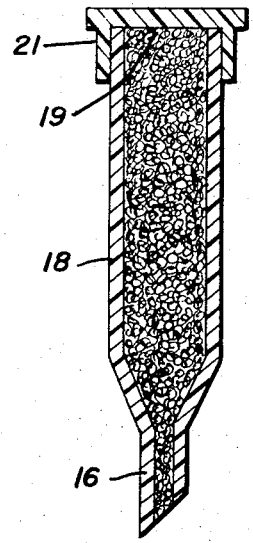
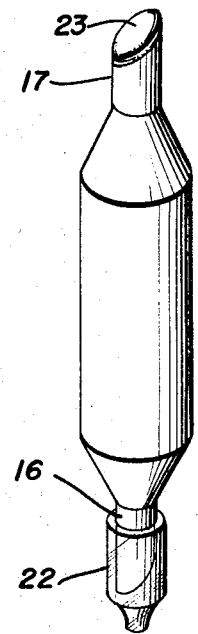

3,449,054
MARKING PEN
Christian B. Lundsager, Ashton, Md., assignor to W. R. Grace & Co., New York, N.Y., a corporation of Connecticut
Filed May 20, 1966, Ser. No. 551,632
Int. Cl. B43k 5/00
U.S. Cl. 401—198                              2 Claims

ABSTRACT OF THE DISCLOSURE

A marking pen from a polymeric material comprising a body having an impermeable exterior sheet and an open pore cellular core with a marking tip formed at one end of said body. The pen can be filled with a marking fluid occupying the intercellular pore space.

---

The present invention relates to the manufacture of marking pens, and provides a method by which marking pens may be produced at extremely low cost.

I have discovered that a fine foam not only will store sufficient marking ink to produce a pen which has reasonable life, but that the foam itself makes an excellent writing tip. In producing foams against a molding surface, an impermeable skin forms on the foam where it contacts with the molding wall. This is characteristic of foams whether produced in fixed mols or extruded in the form of rods.

In the present invention, the foam is extruded under such conditions that an impermeable skin is formed on a continuous rod. Thus, both the ink storage means and its impermeable case are formed by a single operation.

The invention may best be understood by reference to the drawings in which

FIGURE 1 illustrates a foamed rod as delivered by the extruding apparatus.

FIGURE 2 illustrates a short section of the rod after the necking operation. The compression dies are diagrammatically indicated.

FIGURE 3 is a vertical cross-section through a completed marking pen.

FIGURE 4 is a perspective view of an alternative form of a finished pen.

In carrying out the invention, a foamable mixture is placed in the hopper of an extruding device. The temperature is adjusted so that a continuous, impervious film, 11, is formed on the exterior surface of the extrusion or rod, 10, while the remainder of the interior volume is occupied by a porous structure, 12, composed of fine, but interconnected cells and which later become the ink reservoir.

Subsequent to extrusion, the foamed rod, 10, is passed between heated dies, 13 and 14 (FIG. 2), which squeeze the rod at spaced intervals and materially reduce its diameter. The cells in the pressed portion of the rod are materially compressed in size, and a neck, 15, is formed as shown in FIG. 2. Despite compression, the cells, nevertheless, remain connected, and are capable of feeding ink through the capillary channels.

In one embodiment of the invention the necks, 15, are severed at their mid-point at an angle of 45° to form the writing tip, 16. The uncompressed body portions, 17, of the rod, 10, are also severed at their approximate mid-points to form a pen body, 18, having an open end.

Subsequently, the pen is saturated with a marking fluid by pouring the fluid into the open end, 19, which then is closed by any suitable means, 21.

Alternatively, as shown in FIG. 4, the body portions, 17, are not cut, but only a 45° cut is made in the neck portion, 15. This makes a pen with a tip on each end.

Such pens are filled with marking fluid by immersing the marking end, 16, in a supply of marking fluid and slipping the opposite end, 17, into an aspirator tube. Marking fluid, drawn in by the vacuum, saturates the foam very quickly. Subsequently the end, 17, is capped by any suitable means or is closed by heat fusion as shown at 23. The marking end, 16, may also be capped by any suitable means as shown at 22 to prevent evaporation or smearing of the ink.

The diameters and tip sizes and, to a certain extent, the thickness of the impermeable skin are matters of choice. As an example, the rod may have an impermeable skin about .005 of an inch in thickness surrounding a core of foam. Its exterior (barrel) diameter may be 3/8 of an inch. At approximately 4-inch intervals, the rod is compressed between dies, 13 and 14, to form a neck element one inch long and 3/16 of an inch in diameter, which then can be cut at an angle of 45° to form a tip approximately 1/2 an inch long.

A considerable choice of materials exists: polyethylene (particularly the polyethylenes which simultaneously may be crosslinked and foamed to produce fine open-pore structures), foamed polyurethanes, and open-pore vinyl foams such as polyvinyl chloride are suitable.

EXAMPLE 1

A formulation comprising 100 parts of a linear polyethylene (Grex 50–050 C.) having a 0.95 density and a standard load melt index of 5.0 (ASTM D 1238–62T, Condition E), 2 parts of azobisformamide, and 2 parts of zinc stearate, is extruded through a Brabender 3/4" extruder, into a 3/8" rod. The barrel temperature of the extruder is maintained at 280–300° F. along the length of the barrel. Compression ratio is 4:1. The foamed rod issuing from the extruder is allowed to expand until its diameter reaches 3/8 of an inch, and then is water-quenched to check further expansion of the blowing gas. The rod has an impermeable skin about .005 of an inch thick, and a foamed interior structure of open pores. When the rod has reached room temperature, it is compressed between a pair of dies having a one-inch face, through which a semi-circular channel has been cut through each die 3/32 of an inch in radius. The dies are heated to about 270° F., and closed on the tube at approximately 6" intervals, forming a neck approximately 3/16 of an inch in diameter. After the compressed necks have reached room temperature, the individual necks are cut in two at an angle of 45° to the axis of the tube, thus forming a marking tip. The body portions are then cut in two, normal to the axis of the rod, at approximately their central point leaving an open end with the full diameter of the foamed core exposed.

The pen so formed is filled with a marking fluid composed of alcohol, glycerine, and alizarin, by pouring the ink into the open end, 19. The pen is capped with cap, 21. The pen produced a bright red image and did not leak at any time even when it had been laid on its side for a period of 20 hours.

EXAMPLE 2

Lengths of the same rod extrusion used in Example 1 are cut at an angle of 45° in the necked portions, 15. One of the several ends is immersed in a glycerine-alcohol solution which is colored with alizarin while the other end is slipped into a rubber vacuum tube connected to an aspirator. The foam core is promptly filled with the ink.

The pen is disconnected and its upper end is heat-sealed by momentarily squeezing the tip between flat dies heated to approximately 300–325° F.

The techniques of extrusion are well understood, and extended discussion is unnecessary. Generally, in order to produce open cells, a period of free expansion must be permitted after the extrusion leaves the extrusion head. Undue expansion may be controlled by a water quench to limit the expansion of the gas bubbles.

Pore size is determined by the proportion of blowing agent added to the polymer and the degree of expansion which is permitted before cooling. Since the desired result depends upon a series of variables such as the specific polymer, barrel temperature of the extruder, compression ratio, and die diameter, the correct amount is best determined, as is the usual practice, by test extrusion.

Capping the open end, 19, and sealing the tip, 17, are necessary only to prevent the evaporation of the volatiles in whatever ink formula may be used. The pen will not leak ink if left uncapped and laid on its side. Tests made with pens made as above, left uncapped and laid on their sides for a period of one hour, and again at 20 hours, showed no leakage or seepage of ink. However, when the writing tip is pressed against paper, it marks clearly and cleanly and in the same manner as a conventional felt-tipped pen.

Pens so produced are extremely inexpensive and are effective, dependable marking devices.

What is claimed is:

1. A marking pen comprising a body formed from a polymeric substance, said body having an impermeable exterior sheath and an open pore cellular core, both said sheath and said core being formed of the same said polymeric substance, a marking tip formed at one end of said body and a marking fluid occupying the intercellular pore space.

2. A marking pen according to claim 1 wherein said polymeric substance is selected from the group consisting of polyethylene, polyurethane and polyvinyl chloride.

References Cited

UNITED STATES PATENTS

| 3,048,537 | 8/1962 | Pall et al. |
| 2,688,380 | 9/1954 | MacHenry. |
| 3,006,346 | 10/1961 | Golding _____ 131—265 XR |
| 3,232,805 | 2/1966 | Touey et al. |

FOREIGN PATENTS

| 950,243 | 2/1964 | Great Britain. |

ROBERT W. MICHELL, *Primary Examiner.*

U.S. Cl. X.R.

401—265